(12) United States Patent
Gysling

(10) Patent No.: US 9,435,681 B2
(45) Date of Patent: Sep. 6, 2016

(54) METHOD FOR IN-SITU CALIBRATING A DIFFERENTIAL PRESSURE PLUS SONAR FLOW METER SYSTEM USING DRY GAS CONDITIONS

(75) Inventor: Daniel L. Gysling, Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 1308 days.

(21) Appl. No.: 13/313,836

(22) Filed: Dec. 7, 2011

(65) Prior Publication Data

US 2012/0166125 A1    Jun. 28, 2012

Related U.S. Application Data

(60) Provisional application No. 61/420,598, filed on Dec. 7, 2010.

(51) Int. Cl.
*G01F 25/00* (2006.01)
*G01F 1/50* (2006.01)
*G01F 1/66* (2006.01)

(52) U.S. Cl.
CPC ............. *G01F 25/0007* (2013.01); *G01F 1/50* (2013.01); *G01F 1/66* (2013.01)

(58) Field of Classification Search
CPC ........ G01F 1/50; G01F 25/0007; G01F 1/74; G01N 11/02

USPC .......................................................... 702/100
See application file for complete search history.

(56) References Cited

U.S. PATENT DOCUMENTS

| | | | |
|---|---|---|---|
| 7,389,187 B2 | 6/2008 | Kersey et al. | |
| 7,603,916 B2 | 10/2009 | Gysling | |
| 2008/0236298 A1* | 10/2008 | Gysling | G01F 1/36 73/861.42 |
| 2010/0094569 A1 | 4/2010 | Gysling | |
| 2010/0305882 A1 | 12/2010 | Gysling | |

* cited by examiner

*Primary Examiner* — Elias Desta
(74) *Attorney, Agent, or Firm* — O'Shea Getz P.C.

(57) ABSTRACT

A method and system for in situ calibrating a flow metering system to monitor fluid flow in a pipe from a well is provided. The method includes the steps of: a) measuring a first characteristic of the fluid flow exiting the well using a DP flow meter during a dry gas period, and producing an first output data representative of the first characteristic; b) measuring a second characteristic of the fluid flow exiting the well using a SONAR flow meter time during the dry gas period, and producing a second output data representative of the second characteristic; c) determining a dry gas offset between the DP flow meter and the SONAR flow meter based on the first output data and the second output data; and d) calibrating the flow metering system using the dry gas offset.

15 Claims, 3 Drawing Sheets

METHOD FOR IN-SITU CALIBRATING A DIFFERENTIAL PRESSURE PLUS SONAR FLOW METER SYSTEM USING DRY GAS CONDITIONS

This application claims the benefit of U.S. Provisional Application No. 61/420,598 filed Dec. 7, 2010.

BACKGROUND OF THE INVENTION

1. Technical Field

The present invention is directed toward an apparatus and method for determining gas and liquid rates from gas continuous production wells using a differential pressure flow meter installed in series with a SONAR flow meter.

2. Background Information

Flow measurement using a differential pressure type flow meter in combination with a SONAR type flow meter (collectively referred to as a "DP plus SONAR flow meter system") is well known within the oil and gas field. DP flow meters are widely used to monitor gas production and are well-known to over-report the gas flow rate in the presence of liquids. This tendency to over report due to wetness indicates a strong correlation with the liquid to gas mass ratio of the flow. SONAR flow meters, in contrast, are known to accurately report gas flow rates with less sensitivity to liquid loading. As such, this dissimilar sensitivity to wetness associated with SONAR flow meters and DP flow meters provides a practical means for accurately measuring the gas flow rate and the liquid flow rate of a wet gas flow. The use of a DP plus SONAR flow meter system to evaluate a fluid flow has limitations, however.

Although the difference in wetness sensitivity between DP and SONAR flow meters can be utilized advantageously to determine the gas flow rate and the liquid flow rate, the accuracy of those determinations is based on the assumption that both types of flow meters report the same gas flow rates under dry gas conditions. FIG. 1 illustrates the convergent/divergent reporting characteristics of a DP flow meter and a SONAR flow meter. Specifically, FIG. 1 illustrates the relationship of the Lockhardt-Martinelli Number to the output data 20 of a DP flow meter, the output data 22 of a SONAR flow meter, and illustrates a difference 24 between the two. If both meters do not report the same flow characteristic values in a dry gas condition, any liquid rate reported by the DP plus SONAR flow meter system will be inaccurate because the liquid rate determination is a function of the difference in the gas rates reported by the individual system; i.e., any offset in the two meters under dry gas conditions will result in an error in the reported liquid rate. Thus, the accuracy of the measurement of liquids within a DP plus SONAR system is directly related to dry gas rates reported by each flow meter, or any offset there between.

There are many sources for systematic offsets between the dry gas rate determined by two flow meters installed on a line in series in general, and in particular, between a DP flow meter and a SONAR flow meter. The offsets in dry gas flow rates can be due to several potential sources, including, but not limited to, the following: 1) error in measured DP; 2) errors in flow geometry; 3) the impact of non-fully developed pipe flows; 4) the impact of pipe wall roughness; 5) errors in flow stream composition; and 6) errors in the PVT models for the well stream composition.

In the event of an offset, an in-situ calibration would be required to accurately determine absolute liquid production rates. Since providing an accurate measure of produced gas and liquid rates is often a primary reason for performing well surveillance activities, the need for in-situ calibration (typically provided using either a well test separator or other method) limits the utility of DP plus SONAR for many applications.

The performance of a well from a gas reservoir is often impacted by water from the reservoir. In this scenario, the hydro carbon composition of flows from such wells tends to be fairly constant with time, although the amount of water within the flow tends to increase over time. Tracking the amount of water produced from the well is important for many reasons, including predicting reservoir performance, estimating well deliverability, scheduling of well interventions, and optimizing surface production facilities.

The process of producing liquids from a gas continuous well can be quite complex and time varying. The quantity of liquids produced can be determined using a number of different parameters such gas and liquid properties, flow rates, and pipe layout and flow regimes. After a shut-in period, operators typically flow a multiphase well at given choke setting for a significant period of time to achieve stabilized flow rates. This stabilization period allows the multiphase flow within the wellbore, risers, and surface piping to reach conditions representative of typical production conditions. The time period required for the liquid and gas rates to stabilize is typically several hours to several days.

When a well is "shut-in" (i.e., no flow through the well), the gas and liquids within the well separate due to gravity. The liquids within the well bore will, depending on the well geometry, fall to the bottom of the well. The gas will rise to the top. When the choke on the well is opened after a shut-in period, the well will typically flow dry gas initially. It takes a finite period of time for the well to "lift" the liquids to the surface. During the initial flow period after a shut-in, the well can flow essentially "dry gas"; i.e., gas free of any free liquids.

What is needed is a practical in situ method and apparatus for calibrating a DP plus SONAR flow meter system.

SUMMARY OF THE INVENTION

According to an aspect of the present invention, a method for in situ calibrating a flow metering system to monitor fluid flow in a pipe from a well is provided. The method includes the steps of: a) measuring a first characteristic of the fluid flow exiting the well using a DP flow meter during a dry gas period, and producing an first output data representative of the first characteristic; b) measuring a second characteristic of the fluid flow exiting the well using a SONAR flow meter time during the dry gas period, and producing a second output data representative of the second characteristic; c) determining a dry gas offset between the DP flow meter and the SONAR flow meter based on the first output data and the second output data; and d) calibrating the flow metering system using the dry gas offset.

According to another aspect of the present invention, a method for calibrating a flow metering system is provided. The method includes the steps of: a) measuring a characteristic of a dry gas flow using a DP flow meter, and producing a first output data representative of the characteristic; b) measuring a characteristic of a dry gas flow using a SONAR flow meter time during the dry gas period, and producing a second output data representative of the characteristic; c) determining a dry gas offset between the DP flow meter and the SONAR flow meter based on the first output data produced by the DP flow meter and second output data produced by the SONAR flow meter; and d) calibrating the flow metering system using the dry gas offset.

According to another aspect of the present invention, a fluid flow metering system is provided. The system includes a DP flow meter, a SONAR flow meter, and a processor. The DP flow meter is operable to measure a characteristic of a fluid flow, and produce a first output data representative of the flow characteristic. The SONAR flow meter is operable to measure a characteristic of a fluid flow, and produce a second output data representative of the flow characteristic. The processor is adapted to determine a dry gas offset between the DP flow meter and the SONAR flow meter based on the first output data produced by the DP flow meter and second output data produced by the SONAR flow meter, and to self calibrate using the dry gas offset.

These and other features and advantages of the present invention will become apparent in light of the detailed description of the present invention provided below.

BRIEF DESCRIPTION OF THE DRAWINGS

FIG. 5 is a graph diagrammatically showing the volumetric flow rates as a function of time shown in FIG. 4, with a scaled adjustment made to output of the SONAR flow meter to better align the output from the two flow meters for the dry gas flow period occurring in the first twelve hours or so after shut-in.

DETAILED DESCRIPTION OF THE INVENTION

Figure 1:
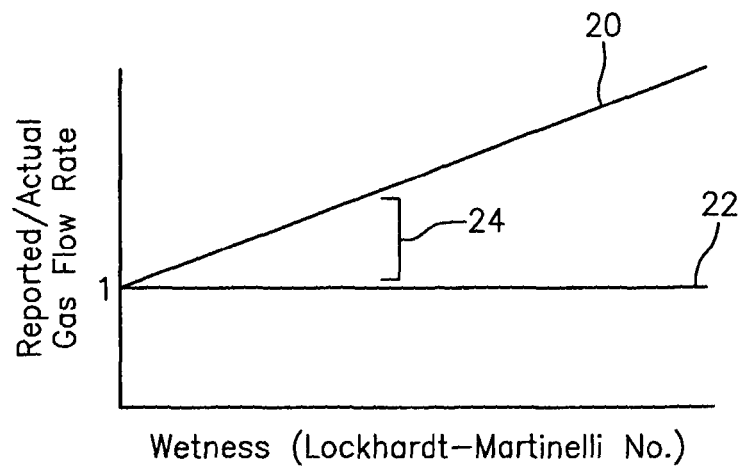
FIG. 1 is a plot of the output of a DP flow meter and an output of a SONAR flow meter to illustrate that the wetness of the gas is related to the difference of the two outputs in accordance with the present invention.

The present method for in situ calibrating a DP plus SONAR flow meter system 26 includes the steps of: a) measuring a fluid flow rate exiting a well using a DP flow meter 28 during a dry gas period, and measuring a fluid flow rate exiting the well using a SONAR flow meter 30 during the dry gas period; b) determining a dry gas offset between the DP flow meter 28 and the SONAR flow meter 30 based on the fluid flow rates measured from DP flow meter 28 and the SONAR flow meter 30 during the dry gas period; and c) calibrating the DP plus SONAR system 26 using the dry gas offset.

The DP flow meter 28 may include any type of flow meter that can determine a differential pressure in the fluid flow 29. An example of an acceptable DP flow meter 28 is one that is operable to determine a pressure drop in a flow of fluid, or gas, or mixture thereof, traveling within a pipe 32 across a constriction within that pipe 32. Venturi, orifice, elbow, V-cone, and wedge type flow meters are examples of DP flow meters 28 that utilize a flow constriction. Another type of acceptable DP flow meter 28 is one that measures a pressure drop between two separated points in a pipe 32; e.g., one that includes a first pressure transducer operable to measure the fluid flow pressure at a first position along the axial length of a pipe 32 and a second pressure transducer operable to measure the fluid flow pressure at a second position axial position, where a fixed geometry of pipe 32 having a axial length "L" is disposed between the two positions.

An example of an acceptable fluid flow meter is the SONAR flow meter 30 described in U.S. Pat. No. 7,389,187 entitled "Apparatus and Method for Using an Array of Ultrasonic Sensors for Determining the Velocity of a Fluid within a Pipe", which patent is hereby incorporated by reference in its entirety. To facilitate the description of the present invention, the fluid flow meter example described in the '187 Patent will be at least partially described herein. The present invention is not limited to using this fluid flow meter 10, or any other particular SONAR flow meter 30.

In this embodiment, the SONAR flow meter 30 includes an active type sensing device comprising an array of ultrasonic sensor units 34. Each sensor unit 34 comprises a pair of ultrasonic sensors, one of which functions as a transmitter (Tx) 36 and the other as a receiver (Rx) 38. The sensor units 34 are spaced axially along the outer surface of a pipe 32 having a process flow propagating therein. The sensors within each pair are oppositely disposed on the pipe 32 at predetermined locations along the pipe 32 to provide a through transmission configuration, such that the sensors 34 transmit and receive an ultrasonic signal that propagates through the fluid substantially orthogonal to the direction of the flow of the fluid within the pipe 32. The SONAR flow meter 30 is not limited to this particular transmitter/receiver configuration.

Figure 2:
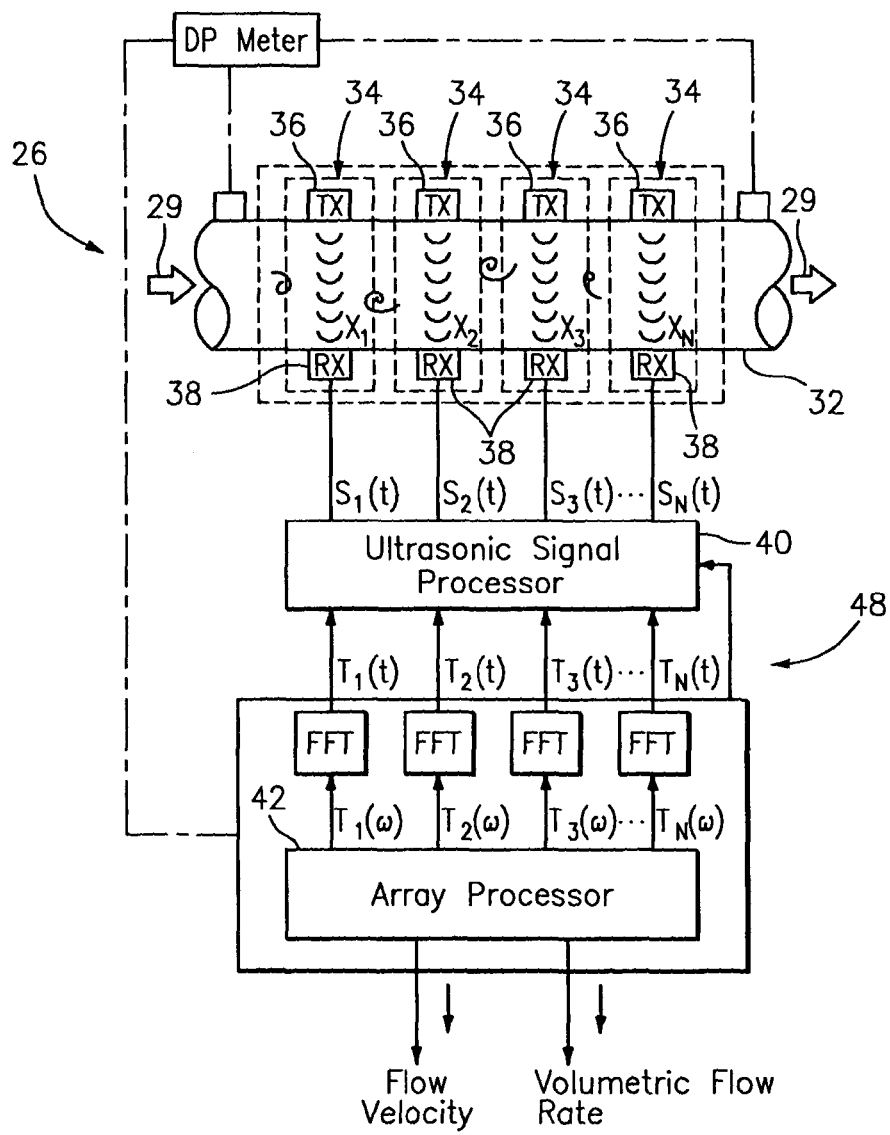
FIG. 2 is schematic diagram of an embodiment of a DP plus SONAR flow meter system, including a SONAR flow meter having an array of sensors and a DP flow meter diagrammatically disposed upstream of the SONAR meter.

As shown in FIG. 2, each pair of ultrasonic sensors measures a transit time (i.e., time of flight (TOF), or phase modulation) of an ultrasonic signal propagating through the fluid from the transmitting sensor to the receiving sensor. The transit time measurement or variation is indicative of one or more coherent properties that convect with the flow within the pipe 32 (e.g., vortical disturbances, inhomogeneities within the flow, temperature variations, bubbles, particles, pressure disturbances), which are indicative of the velocity of the process flow. The ultrasonic sensors 34 may operate at a variety of different frequencies. There is, however, likely an optimum sensor frequency range associated with the particular application at hand. Examples of frequencies used for a flow meter embodying the present invention used in oil and gas applications are 0.1 MHz and 5 MHz. The ultrasonic sensors 34 may also provide a pulsed, chirped or continuous signal through the fluid flow 29. An example of the sensors 34 that may be used are Model no. 113-241-591, manufactured by Krautkramer.

An ultrasonic signal processor 40 fires the sensors 34 in response to a firing signal and receives the ultrasonic output signals $S_1(t)$-$S_N(t)$ from the sensors 34. The signal processor 40 processes the data from each of the sensors 34 to provide an analog or digital output signal $T_1(t)$-$T_N(t)$ indicative of the time of flight or transit time of the ultrasonic signal through the fluid. The signal processor 40 may also provide an output signal indicative of the amplitude (or attenuation) of the ultrasonic signals. One such signal processor is model no. USPC 2100 manufactured by Krautkramer Ultrasonic Systems.

The output signals ($T_1(t)$-$T_N(t)$) of the ultrasonic signal processor 40 are provided to an array processor 42, which processes the transit time measurement data to determine one or both of the flow velocity and the volumetric flow rate. As indicated above, the transit time is defined as the time it takes for an ultrasonic signal to propagate from the transmitting sensor to the respective receiving sensor through the pipe wall and the fluid. The effect of the vortical disturbances (and/or other inhomogeneities within the fluid) on the transit time of the ultrasonic signal is to delay or speed up the transit time. Therefore, each sensing unit 34 provides a respective output signal $T_1(t)$-$T_N(t)$ indicative of the variations in the transit time of the ultrasonic signals propagating orthogonal to the direction of the fluid. The present invention does not require the processor be adapted to any particular signal processing technique, and therefore known techniques such as k-ω plot, cross-correlation, etc., can be used and will not be further described herein.

Figure 3:
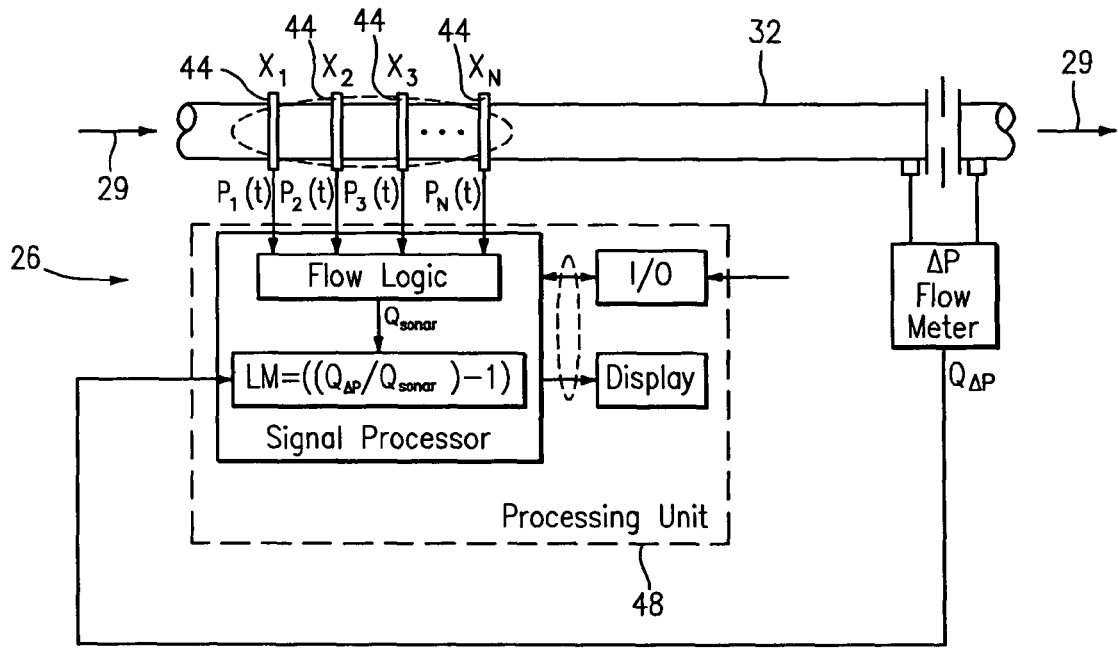
FIG. 3 is schematic diagram of an embodiment of a DP plus SONAR flow meter system, including a SONAR flow meter having an array of sensors and a DP flow meter diagrammatically disposed downstream of the SONAR meter.

Referring to FIG. 3, another example of an acceptable SONAR flow meter 30 is described in U.S. Pat. No. 7,603,916, which is hereby incorporated by reference in its entirety. The '916 Patent details a passive type SONAR flow meter 30 that includes a spatial array of at least two pressure sensors 44 disposed at different axial locations $X_1$-$X_N$ along the pipe 32. Each of the pressure sensors 44 provides a pressure signal P(t) indicative of unsteady pressure within the pipe 32 corresponding to axial locations $X_1$-$X_N$ of the pipe 32. A signal processor 46 receives the pressure signals $P_1(t)$-$P_N(t)$ from the pressure sensors 44 in the array, and determines the velocity and volumetric flow rate of the fluid flow 29 using pressure signals from the pressure sensors 44. The signal processor 46 then applies array-processing techniques to the pressure signals $P_1(t)$-$P_N(t)$ to determine the velocity, volumetric flow rate, and/or other parameters of the fluid flow 29.

According to the present method, an in situ DP plus SONAR flow meter system 26 can be calibrated during a limited period of time directly after the choke on a well is opened after a shut-in period. During this initial time period, there is a high probability that the well will flow dry gas; i.e., a fluid flow 29 with an insubstantial amount (or no amount) of liquid. Under the present invention, this initial flow period is used to calibrate a DP plus SONAR system 26 by zeroing out any offset between reported values (e.g., volumetric flow rates) determined by each of the DP flow meter 28 and the SONAR flow meter 30 during dry gas flow conditions. If the DP and SONAR flow meters 28,30 are reporting the same characteristic values during the initial dry gas period, the offset would be zero.

The methodology of the present invention can be implemented by a self-calibrating fluid flow metering system 26 that includes a DP flow meter 28, a SONAR flow meter 30, and a processor 48 in communication with both flow meters. The DP flow meter 28 is operable to measure a characteristic of a fluid flow 29, and produce a first output data representative of the flow characteristic. The SONAR flow meter 30 is operable to measure a characteristic of a fluid flow 29, and produce a second output data representative of the flow characteristic. The processor 48 is adapted (e.g., programmed) to determine a dry gas offset between the DP flow meter 28 and the SONAR flow meter 30 based on the first output data produced by the DP flow meter 28 and second output data produced by the SONAR flow meter 30, and to self-calibrate using the dry gas offset. The processor 48 may be adapted with an algorithm operable to scale, or otherwise adjust, the characteristic values of one or both flow meters based on the determined dry gas offset. The processor 48 that is adapted to accept and produce the inputs and outputs, respectively, may be a microprocessor, a personal computer, or other general purpose computer, or any type of analog or digital signal processing device adapted to execute programmed instructions. Further, it should be appreciated that some or all of the functions associated with the flow logic of the present invention may be implemented in software (using a microprocessor or computer) and/or firmware, or may be implemented using analog and/or digital hardware, having sufficient memory, interfaces, and, capacity to perform the functions described herein.

Figure 4:
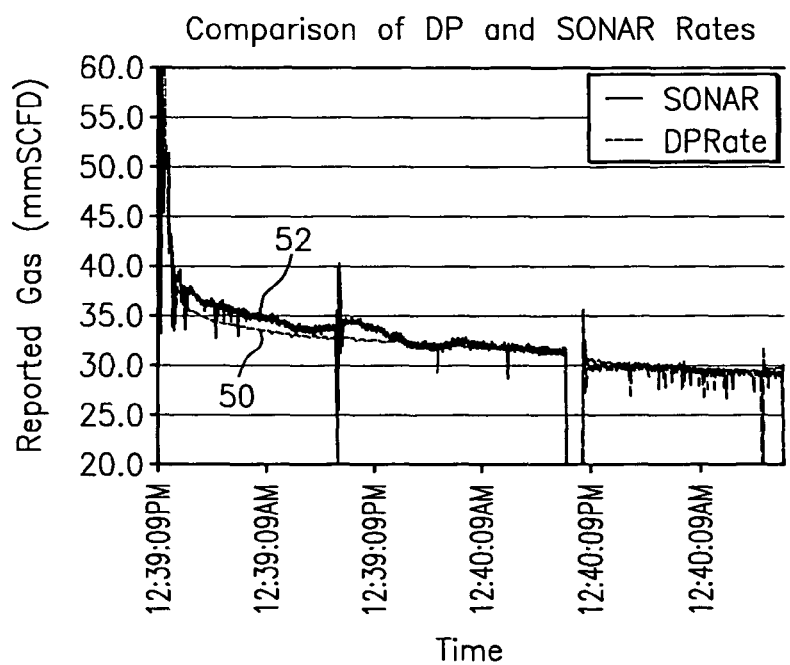
FIG. 4 is a graph diagrammatically showing volumetric flow rates as a function of time reported from a DP flow meter and from a SONAR flow meter utilized within a DP plus SONAR flow metering system. The volumetric flow rates are recorded over a period of time approximately equal to three (3) days, starting after a shut-in of the well.
Figure 5:
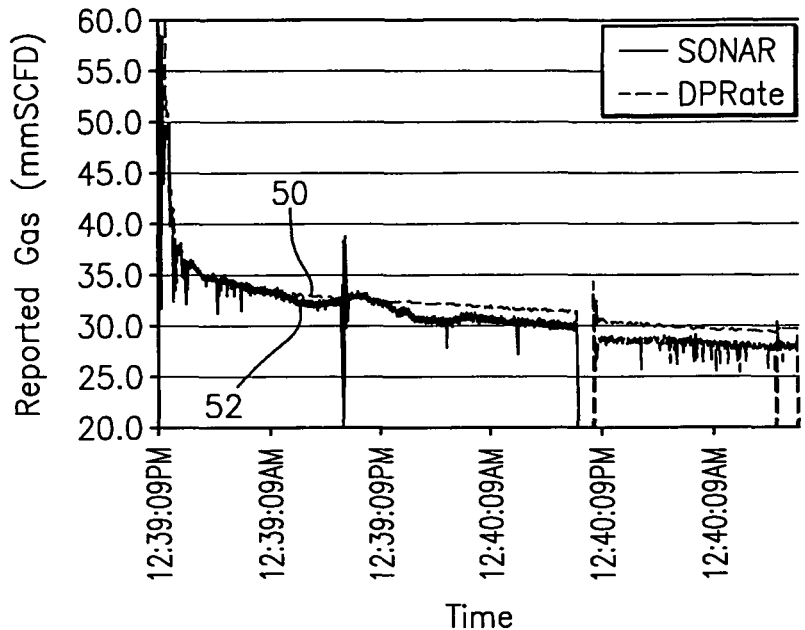

FIG. 4 shows flow rates (at standard conditions) reported from a DP plus SONAR system 26 having a DP flow meter 28 and SONAR flow meter 30 installed in series on a well over an initial period of time approximately equal to three (3) days, which period started with the first fluid flow 29 passing through the well after a shut-in was terminated. Initially, the flow meters 28, 30 may report the same or similar characteristic flow values. Over a greater period of time, however, the flow values 50 reported by the DP flow meter 28 and the flow values 52 reported by the SONAR flow meter 30 differ from one another. The variation between the two reported values 50, 52 indicates that the liquid loading within the well flow varies as a function of time. Assuming that the flow within the well is essentially dry for the initial flow period, any difference in the characteristic values 50, 52 being determined (which difference can be referred to as an "offset"), by the two flow meters (e.g., offset between determined volumetric flow values) can be eliminated with a calibration or scaling factor for one or both of the meters. For example, the volumetric flow rates 50, 52 depicted in FIG. 4 show a slight offset in the initial sensing period; i.e., the dry gas sensing period (e.g., the first three day periods). The application of a scaling factor of 0.955 to the SONAR flow meter output 52 depicted in FIG. 4 results in a much better alignment of the flow values of the two flow meters 28, 30 during the initial "dry gas" flow period. The results of the adjusted flow rates 50, 52 (i.e., adjusted for the offset between the two meters) are shown in FIG. 5. The scaling factor described above (and the consequent scaled results shown in FIG. 5) is an example of a method for adjusting the relative outputs of the two flow meters. The present invention is not limited to this type of adjustment. In addition, the output values of the meters 28, 30 are disclosed above in terms of volumetric flow rates. Other output values (e.g., flow velocity) could be used in the same manner to identify any offset between the two meters 28, 30.

Figure 6:
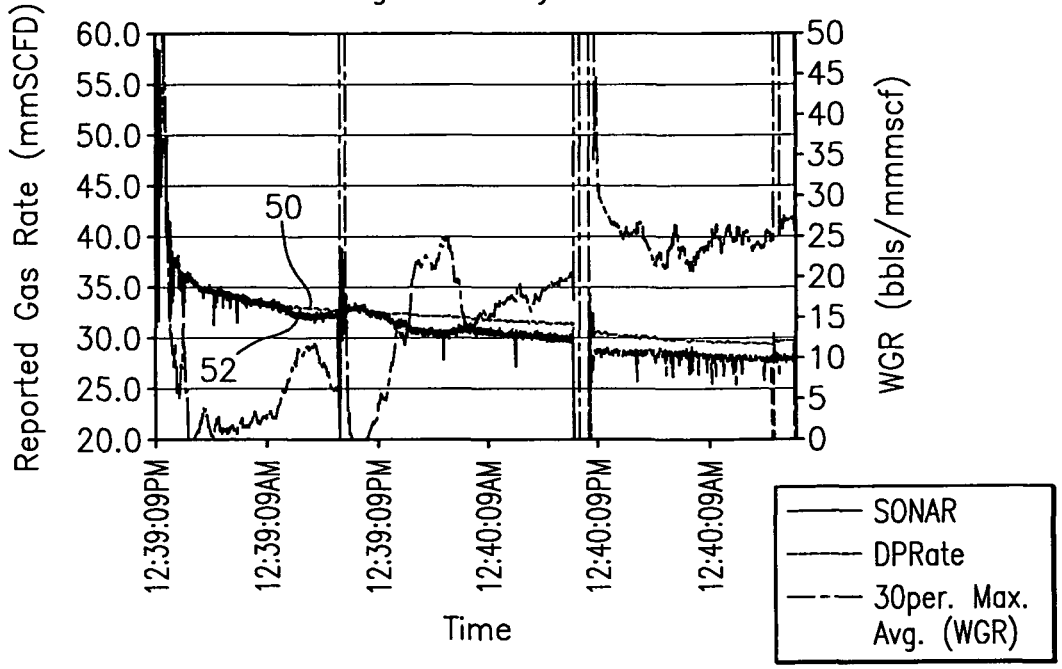
FIG. 6 shows a graph of water to gas mass ratio determined using a DP plus SONAR algorithm with the reported flow rates of the DP flow meter and the SONAR flow meter calibrated during the initial flow period during which the produced gas is assumed to be dry.

FIG. 6 illustrates operation of a DP plus SONAR system 26 calibrated according to the present invention. As shown in FIG. 6, the system 26 reports that the well initially produces dry gas, and then produces liquids in a transient manner, and then stabilizes after about 36 hours of flowing to produce about 25 barrels of liquid per million standard cubic feet per day of well flow (25 bbl/mmscfd).

While the invention has been described with respect to preferred embodiments, those skilled in the art will readily appreciate that various changes and/or modifications can be made to the invention without departing from the spirit or scope of the invention as defined by appended claims.

What is claimed is:

1. A method for in situ calibrating a flow metering system to monitor fluid flow in a pipe from a well, comprising the steps of:
   measuring a first characteristic of the fluid flow exiting the well using a differential pressure flow meter during a dry gas period, and producing an first output data representative of the first characteristic;
   measuring a second characteristic of the fluid flow exiting the well using a SONAR flow meter time during the dry gas period, and producing a second output data representative of the second characteristic;
   determining a dry gas offset between the differential pressure flow meter and the SONAR flow meter based on the first output data and the second output data; and
   calibrating the flow metering system using the dry gas offset,
   wherein the calibrating of the flow metering system includes calibrating at least the differential pressure flow meter to decrease any difference that may exist between the first output data and the second output data.

2. The method of claim 1, wherein the calibrating step is performed over a predetermined period of time.

3. The method of claim 1, wherein the calibrating step includes scaling the output of one of the flow meters, which output is generated during the dry gas period.

4. The method of claim 1, wherein the first output data is representative of a volumetric flow rate determined using the differential pressure flow meter, and the second output data is representative of a volumetric flow rate determined using the SONAR flow meter.

5. The method of claim 1, wherein the SONAR meter determines the second output data using a plurality of ultrasonic sensors, with each sensor having a transmitter and a receiver.

6. A method for calibrating a flow metering system, comprising the steps of:
   measuring a characteristic of a dry gas flow using a differential pressure flow meter, and producing a first output data representative of the characteristic;
   measuring a characteristic of a dry gas flow using a SONAR flow meter time during the dry gas period, and producing a second output data representative of the characteristic;
   determining a dry gas offset between the differential pressure flow meter and the SONAR flow meter based on the first output data produced by the differential pressure flow meter and second output data produced by the SONAR flow meter; and
   calibrating the flow metering system using the dry gas offset,
   wherein the calibrating of the flow metering system includes calibrating at least the differential pressure flow meter to decrease any difference that may exist between the first output data and the second output data.

7. The method of claim 6, wherein the calibrating step is performed over a predetermined period of time.

8. The method of claim 6, wherein the calibrating step includes scaling the output of one of the flow meters, which output is generated during the dry gas period.

9. The method of claim 6, wherein the first output data is representative of a volumetric flow rate determined using the differential pressure flow meter, and the second output data is representative of a volumetric flow rate determined using the SONAR flow meter.

10. The method of claim 6, wherein the SONAR meter determines the second output data using a plurality of ultrasonic sensors, with each sensor having a transmitter and a receiver.

11. A fluid flow metering system, comprising:
    a differential pressure flow meter operable to measure a characteristic of a fluid flow, and produce a first output data representative of the flow characteristic;
    a SONAR flow meter operable to measure a characteristic of a fluid flow, and produce a second output data representative of the flow characteristic; and
    a processor adapted to determine a dry gas offset between the differential pressure flow meter and the SONAR flow meter based on the first output data produced by the differential pressure flow meter and second output data produced by the SONAR flow meter, and to self calibrate using the dry gas offset, the self calibration including a calibration of the differential pressure flow meter.

12. The system of claim 11, wherein the processor is adapted to calibrate the output data of one or both flow meters over a predetermined period of time.

13. The system of claim 11, wherein the processor is adapted to calibrate the output data of one or both flow meters by scaling the output data.

14. The system of claim 11, wherein the first output data is representative of a volumetric flow rate determined using the differential pressure flow meter, and the second output data is representative of a volumetric flow rate determined using the SONAR flow meter.

15. The system of claim 11, wherein the SONAR meter determines the second output data using a plurality of ultrasonic sensors, with each sensor having a transmitter and a receiver.

* * * * *